US005671532A

United States Patent [19]

Rao et al.

[11] Patent Number: 5,671,532

[45] Date of Patent: Sep. 30, 1997

[54] METHOD OF MAKING AN ENGINE BLOCK USING COATED CYLINDER BORE LINERS

[75] Inventors: V. Durga Nageswar Rao, Bloomfield Township; Robert Alan Rose, Grosse Pointe Park; David Alan Yeager, Plymouth; Daniel Michael Kabat, Oxford, all of Mich.

[73] Assignee: Ford Global Technologies, Inc., Dearborn, Mich.

[21] Appl. No.: 352,952

[22] Filed: Dec. 9, 1994

[51] Int. Cl.[6] .......... B23P 15/00

[52] U.S. Cl. .......... 29/888.061; 29/447; 123/193.4; 75/252

[58] Field of Search .......... 29/888.061, 447, 29/458, 460, 527.2; 75/252, 253, 254; 123/193.2–193.5; 252/25, 29

[56] References Cited

U.S. PATENT DOCUMENTS

| | | | |
|---|---|---|---|
| 991,404 | 5/1911 | Woodworth | 29/888.061 X |
| 1,347,476 | 7/1920 | Allyne | 29/888.061 |
| 2,387,971 | 10/1945 | Aspin et al. | 29/888.061 X |
| 2,534,408 | 12/1950 | Bramberry | 427/236 X |
| 3,073,290 | 1/1963 | Stump | 29/888.061 X |
| 3,620,137 | 11/1971 | Prasse | 123/193.2 X |
| 3,930,071 | 12/1975 | Rao et al. | 204/280 |
| 4,473,481 | 9/1984 | Fukutsuka et al. | 252/30 |
| 4,495,907 | 1/1985 | Kamo | 123/193.2 |
| 5,080,056 | 1/1992 | Kramer et al. | 123/193.4 |
| 5,239,955 | 8/1993 | Rao et al. | 29/888.048 |
| 5,332,422 | 7/1994 | Rao et al. | 75/252 |
| 5,363,821 | 11/1994 | Rao et al. | 29/888.061 X |
| 5,482,637 | 1/1996 | Rao et al. | 252/29 |
| 5,566,450 | 10/1996 | Rao et al. | 29/888.061 |

FOREIGN PATENT DOCUMENTS

| | | | |
|---|---|---|---|
| 53-41621 | 4/1978 | Japan . | |
| 60-43150 | 3/1983 | Japan . | |
| 1136900 | 12/1968 | United Kingdom . | |
| 2168632 | 6/1986 | United Kingdom | 29/888.061 |

*Primary Examiner*—Peter Vo
*Assistant Examiner*—Khan Nguyen
*Attorney, Agent, or Firm*—Joseph W. Malleck

[57] ABSTRACT

A method of making coated engine blocks by (a) casting a metallic engine block having one or more cylinder bores; (b) fabricating a thin walled liner for each bore, the liner being constituted of extruded metallic tubing having a cleansed inner surface, a wall thickness controlled to a thickness of 1–3 mm±15 microns, the outer diameter of the liner being slightly greater than the internal diameter of the cylinder bores; (c) relatively rotating the liner with respect to one or more nozzles for applying a plurality of materials to the internal surface of the liner, the materials comprising first a metal texturing fluid that is applied at high pressures to expose fresh metal of the surface, secondly a bond coating material that is thermally sprayed to form a metallurgical bond with the liner internal surface, and a top coating of anti-friction material that is adheringly plasma sprayed to the bond coating; (d) honing the coated internal surface to remove up to 150 microns of top coating, leaving a finish surface that is concentric to the tube axis within ±15 microns; and (e) interference fitting the coated liner to the cylinder bore by freezing the liner while maintaining the block at or above ambient temperature to permit implanting of the liner.

15 Claims, 4 Drawing Sheets

METHOD OF MAKING AN ENGINE BLOCK USING COATED CYLINDER BORE LINERS

BACKGROUND OF THE INVENTION

1. Technical Field

This invention relates to the technology of assembling liners in cylinder bores of internal combustion engines and more particularly to coating such liners with anti-friction materials.

2. Discussion of the Prior Art

Coatings have been applied to iron cylinder bore liners as early as 1911 (see U.S. Pat. No. 991,404), which liners were press fitted into the cylinder bores. However, such early coatings were designed to prevent corrosion, such as by nickel plating. Later coatings applied to iron cylinder bore liners were designed to present a hard surface to prevent wear.

The prior art has not appreciated the value and techniques of coating engine bore liners, particularly those made of aluminum, with anti-friction materials. Moreover, the prior art has failed to enhance the accuracy and economy of fabricating engines with coated low-friction liners to the point that superior productivity is obtained along with highly improved engine performance.

SUMMARY OF THE INVENTION

It is an object of this invention to provide a method of making engine blocks with coated cylinder bore liners that: (a) eliminates many preparatory steps of prior methods; (b) imparts greater concentricity of the coating thereby reducing machining of the final coating surface; and (c) uses more economical coating materials to promote superior anti-friction characteristics.

In particular, the method comprises essentially: (a) casting a metallic engine block having one or more cylinder bores; (b) fabricating a thin walled liner for each bore, the liner being constituted of extruded metallic tubing, preferably of the same material as that of the block, having a cleansed inner surface, a wall thickness controlled to within ±10 microns, the outer diameter of the liner being slightly greater (35±5 microns) than the internal diameter of the cylinder bores of the block that is to receive the liners; (c) relatively rotating the liner with respect to one or more nozzles for applying a plurality of materials to the internal surface of the liner, the materials comprising first a metal texturing fluid that is applied at high pressures to expose fresh metal of the surface, secondly a bond coating material that is thermally sprayed to form a metallurgical bond with the liner internal surface, and a top coat of anti-friction material that is adheringly plasma sprayed to the bond coating; (d) honing the coated internal surface to remove up to 150 microns of top coating, leaving a finish surface that is concentric to the tube axis within ±15 microns; and (e) interference fitting the coated liner to the cylinder bore by freezing the liner while maintaining the block at or above ambient temperature to permit implanting of the liner. By modifying the composition of the top coating, the bond coating may be eliminated and still achieve adequate bond strength.

In another aspect the invention is an aluminum engine block, comprising: (a) a cast aluminum alloy body having one or more precision formed cylinder bores; (b) an extruded aluminum liner fitting in the bore with an interference fit, the liner having an inner surface coated with a coating system prior to implantation; and (c) the coating system comprises a top coat of plasma sprayed iron based particles which, by themselves or by the presence of additional particles, provide solid lubrication properties.

BRIEF DESCRIPTION OF THE DRAWINGS

FIG. 3 depicts the bore surface substrate in a washed and degreased condition, FIG. 4 depicts the aluminum substrate bore surface after it has been subjected to treatment for exposing fresh metal; FIG. 5 depicts the coating system as applied to the exposed fresh metal surface showing a topcoat and a bond coat; and FIG. 6 depicts the coating system of FIG. 5 after it has been honed and finished to size; FIG. 7 illustrates drive torque as a function of the type of coating applied for an engine fabricated with aluminum liners in accordance with this invention; FIG. 8 illustrates dry friction coefficient as a function of the different coatings applied.

DETAILED DESCRIPTION AND BEST MODE

Figure 1:
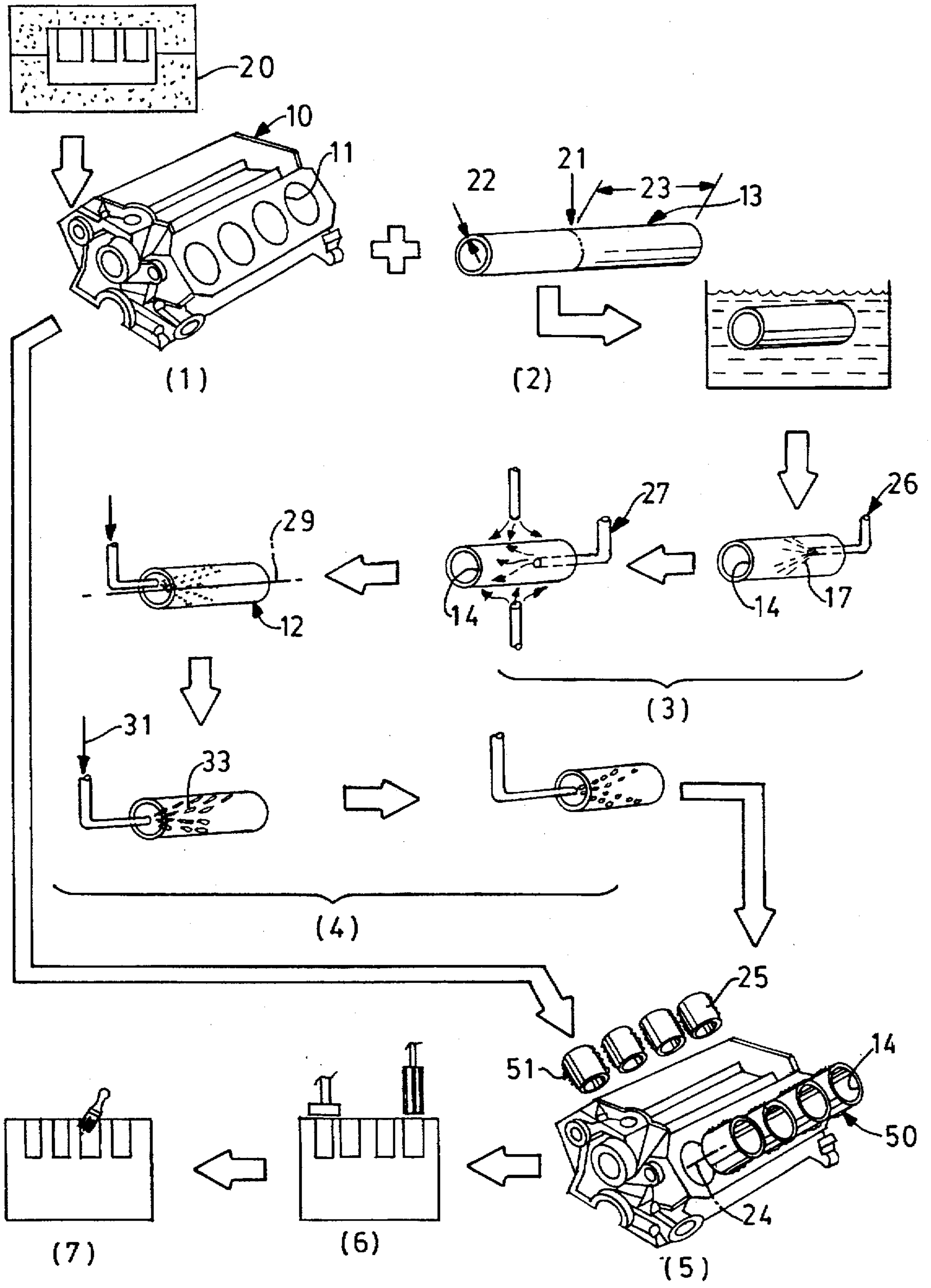
FIG. 1 is a schematic flow diagram of the steps of the method of this invention.

As shown in FIG. 1 the essential steps of the method herein comprises (1) casting a metallic engine block 10 with a plurality of cylinder bores 11, (2) cutting an aluminum liner 12 from an extruded tubing 13, (3) cleansing the internal surface 14 of such liner, (4) rotating such liner about a horizontal axis 17 and sequentially operating on the internal surface 14 to (i) expose fresh metal, (ii) apply a metallurgical bonding undercoat 15, (iii) apply a topcoat 16 having anti-friction properties, (5) implanting the liners into the cylinder bores with an interference fit, (6) optionally honing the exposed coated surface 18 of the liners to a finished state, and (7) optionally coating the honed coating with a polymer based anti-friction coating 19 that can abrade to essentially zero clearance with an associated piston and ring assembly.

The casting of the engine block 10 can be by sand molding (such as in a mold 20 having appropriate gating to permit uniform metal flow and solidification without undue porosity), shell molding (permanent or semi-permanent), die casting, or other commercially acceptable casting technique. Sand molding is advantageous because it provides good product definition with optimum quality and economy for large scale production. The casting process should be controlled in the following manner to ensure proper preparation of the metallic surfaces for the eventual coating system by properly controlling the temperature of the molten metal, design of appropriate gating, and by providing a recess with proper sand core so that the bore centers in the cast block will be center to center within ±200 microns of the specified dimension.

The liner 12 is sectioned from extruded aluminum tubing 13 by high pressure water cutting at 21 or a process that cuts rapidly without inducing distortion (examples are loser cutting and high speed diamond cutting. But high pressure water cutting is preferred). The tubing desirably has a chemistry of commercial duraluminum 6060 alloy. By virtue of commercially available extrusion technology, the tubing 13 has a wall thickness 22 accurate to 35 microns±15 microns over the length 23 of the liner, an internal/external surface 14 that is straight within ±15 microns per foot and diameters concentric to within ±15 microns over the 180 mm length of the liner. The cut tubing need not be precision machined to center its interior surface 14 and assure its concentricity with respect to its intended axis 24; however, the internal surface 14 may be rough honed to remove about 100 microns of aluminum in an effort to present a surface more amenable to receiving a coating. The outside surface 25 may be smoothed by honing to remove about 20 microns of metal therefrom for the purpose of uniformity, accurate mating with the block bore surface to permit a uniform heat path, and for producing a smoother finish with concentricity required as above.

Just immediately prior to coating, the internal surface 14 of the prepared liner 12 is preferably cleansed by vapor degreasing, washing (see 26) and thence air jet drying (see 27). Degreasing is sometimes necessary if the liner by its extrusion techniques tends to leave a residue. Degreasing may be carried out with OSHA approved solvents, such as chloromethane or ethylene chloride, followed by rinsing with isopropyl alcohol. The degreasing may be carried out in a vapor form such as in a chamber having a solvent heated to a temperature of 50° F. over its boiling point, but with a cooler upper chamber to permit condensation.

Figure 3:
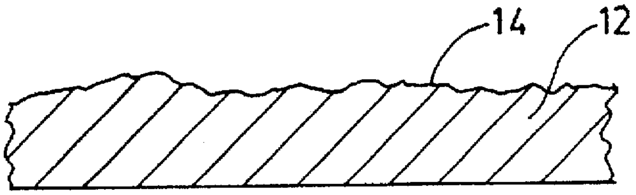
FIGS. 3–6 respectively are greatly enlarged sections of the substrate that changes configuration with respect to the steps of the invention.
Figure 4:
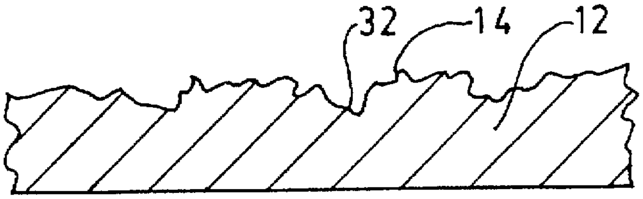

The cleansed liner 28 (having a micro surface appearance as shown in FIG. 3) is then fixtured to revolve about a horizontal axis 29. As the liner rotates, such as at a speed of 100 to 400 rpm, the internal surface 14 may first be treated to expose fresh metal, such as by grit (shot) blasting using non-friable aluminum oxide (40 grit size) applied with 15–25 psi pressure (see 30). Alternatively, fresh metal may be exposed by electric discharge erosion, plasma etching with $FCFC_8$ or halogenated hydrocarbons or vapor grit blast (150–325 mesh). With respect to grit blasting, oil free high pressure air may then be used to eliminate any remnants of the grit. The micro surface appearance is changed by grit blasting as shown in FIG. 4 to have a rougher contour 32. This step may not be necessary if the tube interior surface is alternatively freshly honed to a desirable texture. In the latter case, minimum time (less than 20 minutes) is permitted to elapse before applying the coating.

Secondly, as the liner revolves, a bond undercoat is desirably applied (see 31) by thermal spraying (such as by wire-arc or by plasma spray). The material of the coating is advantageously nickel aluminide, manganese aluminide, or iron aluminide (aluminum being present in an amount of about 2–6% by weight). The metals are in a free state in the powder and react in the plasma to produce an exothermic reaction resulting in the formation of inter-metallic compounds. These particles of the inter-metallic compounds adhere to the aluminum substrate surface upon impact resulting in excellent bond strength. The particles 35 of the bond coat adhere to the aluminum substrate 12 as a result of the high heat of reaction and the energy of impact to present an attractive surface 34 to the topcoat 16 having a highly granular and irregular surface. In some cases, the undercoat can be eliminated provided the composition of the top coat is modified to improve bond strength.

Figure 2:
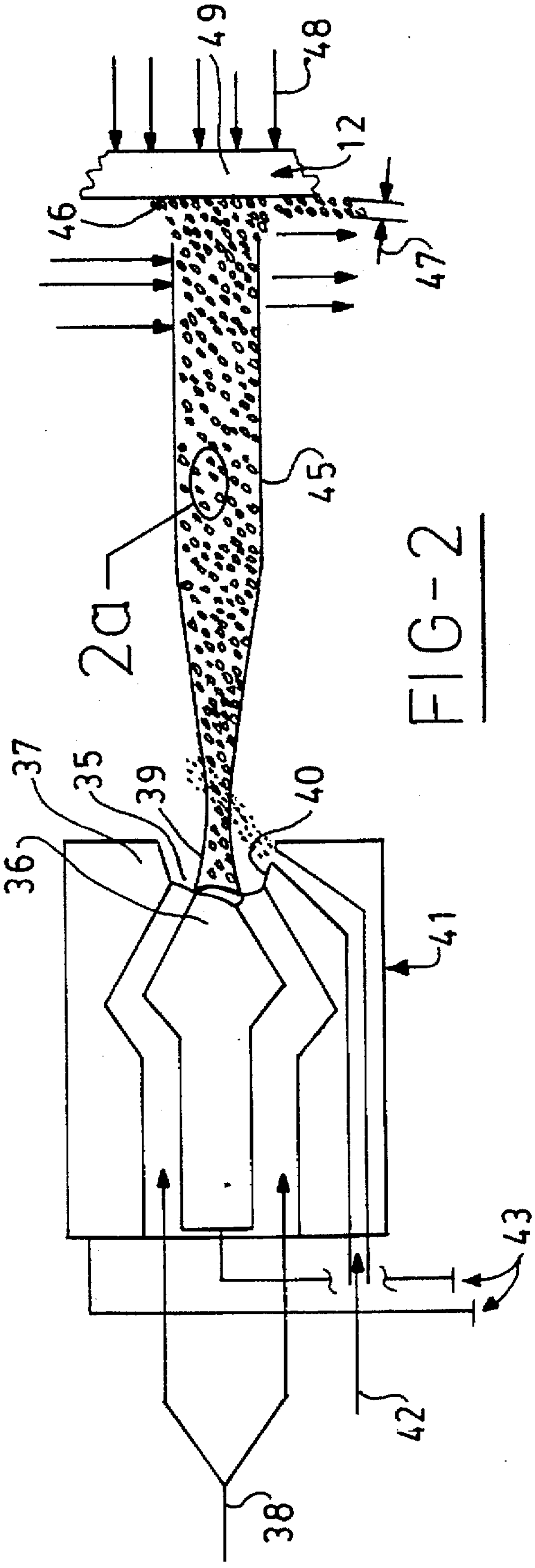
FIG. 2 is a greatly enlarged schematic illustration of a plasma spraying nozzle depicting the spray pattern of creating the coating system of this invention.

Thirdly, the topcoat anti-friction 26 is applied by plasma spraying. A plasma can be created (see FIG. 2) by an electric arc 35 struck between a tungsten cathode 36 and a nozzle shaped copper anode 37, which partially ionizes molecules of argon and hydrogen gas 38 passed into the chamber 40 of the spray gun 41 by injecting powders 42 axially into the 20,000° C. plasma flame 39; particles can reach speeds of about 600 meters per second before impacting onto a target.

Figure 2A:
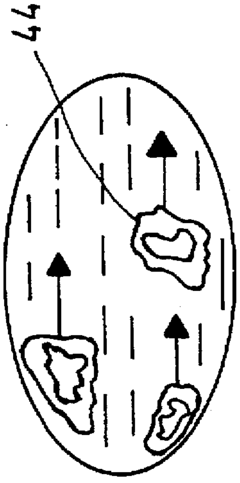
FIG. 2A is an enlarged segment of the spray of FIG. 2.
Figure 5:
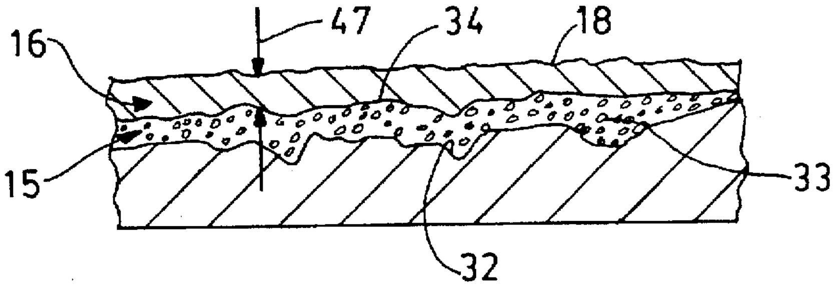

The deposition rate can range between 0.5–2.0 kilograms per hour. The inert gas 38, such as argon with hydrogen, is propelled into the gun 41 at a pressure of about 5 to 150 psi, and at a temperature of 30°–100° F. A DC voltage 43 is applied to the cathode 36 of about 12–45 kilowatts while the liner is rotated at a speed of about 200–300 revolutions per minute. The powder feed supply consists of a metallized powder which at least has a shell of metal that is softened (or is an agglomerated composite of fine metal carrying a solid lubricant) during the very quick transient temperature heating in the plasma steam. The skin-softened particles 44 (see FIG. 2A) impact at 46 on the target surface as the result of the high velocity spray pattern 45. A major portion of the particles usually have an average particle size in the range of −200+325. The plasma spray 45 can deposit a coating thickness 47 (see FIG. 5) of about 75°–250 microns in one pass along the length 23 of the liner. Concurrent with the plasma spraying of the internal surface 14, the outside surface of the liner may be cooled with compressed air (see 48 in FIG. 2) thereby ensuring an absence of distortion or at least a maximum distortion of the wall 49 of the liner to 15 microns.

The powder particles 44 can be, for purposes of this invention, any one of (i) iron or steel particles having an oxide with a low coefficient of dry friction of 0.2–0.35 or less, (ii) a nonoxide steel or other metal which is mixed with solid lubricants selected from the group consisting of graphite, BN, or eutectics of $LiF/NaF_2$ or $CaF_2/NaF_2$; and (iii) metal encapsulated solid lubricants of the type described in (ii). It is important that the chemistry of these powders all present a coating dry coefficient of friction which is less than 0.4 and present a high degree of flowability for purposes of being injected into the plasma spray gun.

An anti-friction overcoat 19 may optionally be put onto the top coat 16. Such overcoat 19 may comprise a thin (about 10 microns) polymer based anti-friction material that is heat curable, highly conductive and can abrade to essentially zero clearance with an associated piston and ring assembly. With excellent dimensional control of the cylinder bore diameter (±15 microns maximum variation) and well controlled coating operation, the liners can be honed to final finish before the liner is inserted into the bore with an interference fit.

Implanting of the coated liners 50 takes place by cooling the liners to a temperature of about −100° C. by use of isopropyl alcohol and dry ice. While the engine block is maintained at about ambient temperature, the frozen liners along with their coatings are placed into the bore and allowed to heat up to room temperature whereby the outer surface of the bore comes into intimate interfering contact with the cylinder bore walls as a result of expansion. The tubing that is used to make the liners should have a outside diameter that is about 35 microns (±15 microns) in excess of the bore internal diameter of the engine block while they're both at ambient temperatures. It is advantageous to coat the exterior surface 25 of the liner with a very thin coating 51 of copper flake in a polymer, such coating having a thickness of about 5–10 microns. Thus, when the liner is forced into an interference fit with the aluminum block cylinder wall, a very intimate thermally conductive bond therebetween takes place.

Optionally, the coated surface may be plateau honed in steps of about 100, 300, and 600 grit to bring the exposed coated surface 18 to a predetermined surface finish. The cylinder block, containing the liners, may protrude approximately 10 to 25 microns over the face surface of the block; such protrusion is machined (deck faced) to uniformity required for sealing the engine gasket. The polymer based solid film lubricant coating in this case, is applied onto a pre-honed surface. If the coating system 52 (bondcoat 15, topcoat 16, overcoat 19) is applied in a very thin amount to a pre-precision machined bore surface, then honing may not be necessary.

An aluminum engine block, made by the above process, will comprise: a cast aluminum alloy body 10 having one or more precision cylinder bores 11, an extruded aluminum liner 12 in each bore 11 with an interference fit, the liners 12 having an internal surface 14 coated with a coating system 52 prior to such implantation, the coating system comprising a topcoat 16 of plasma sprayed iron based particles which, by themselves or by the presence of additional particles, provide solid lubrication properties.

Figure 6:
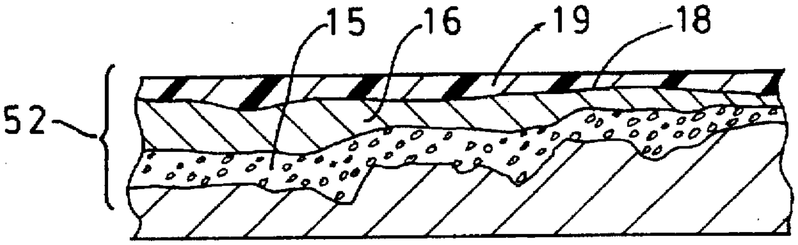
Figure 7:
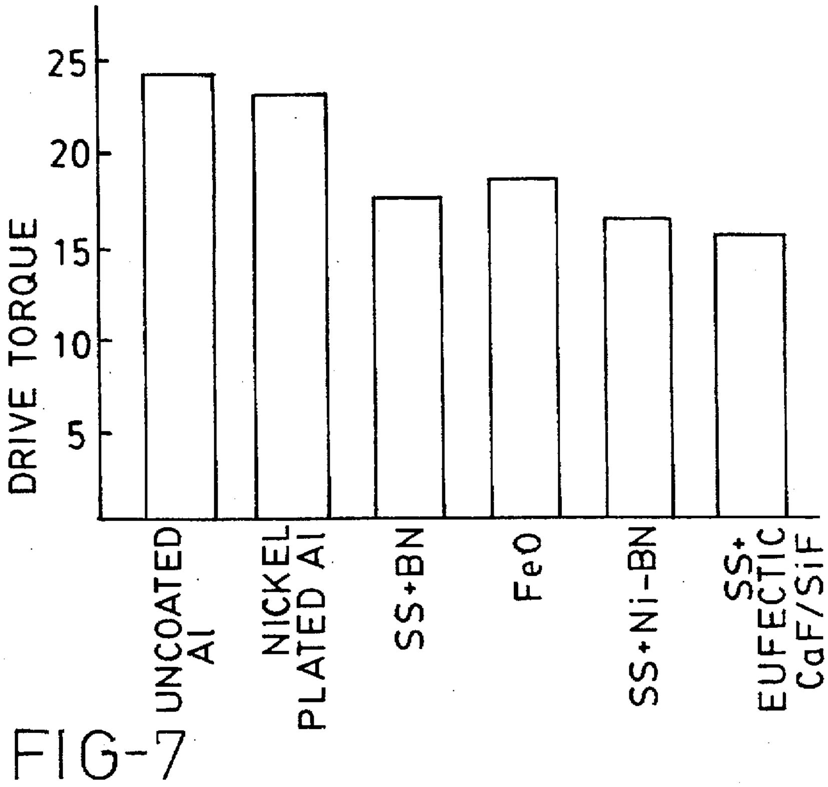
FIGS. 7 and 8 respectively are graphical diagrams.
Figure 8:
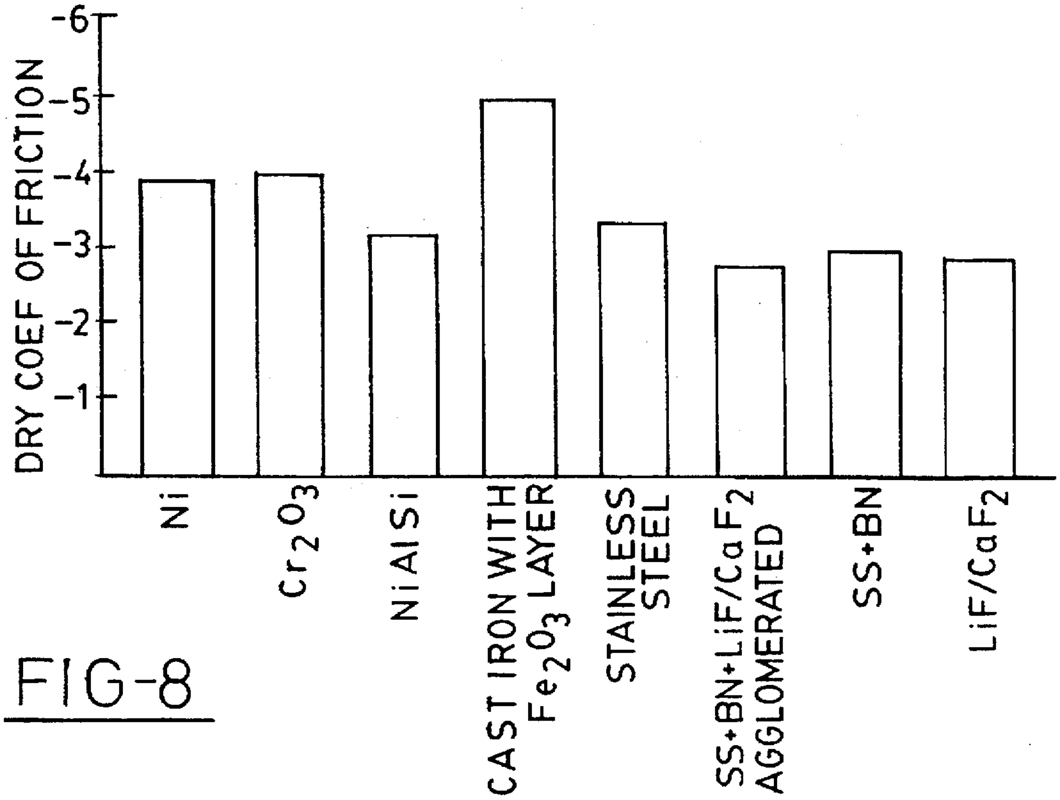

If the coating system 52 has a 75 micron bond layer 15, and a 75 micron topcoating 16, and, assuming a selected chemistry for the topcoat as shown in FIGS. 6 and 7, the drive torque and coefficient of friction will respectively be lower than for any uncoated or nickel plated topcoat using aluminum bore walls. The topcoat variations of this invention include (i) stainless steel particles mixed with boron nitride (SS+BN), (ii) Fe+FeO particles, (iii) stainless steel particles commingled with nickel encapsulated boron nitride (SS+Ni–BN), (iv) stainless steel particles commingled with eutectic particles of $LiF/CaF_2$ and (v) stainless steel particles commingled and composited with BaF.

As is evident from the foregoing description, certain aspects of the invention are not limited to the particular details of the examples illustrated, and it is therefore contemplated that other modifications and applications will occur to those skilled in the art. It is accordingly intended that the claims shall over all such modifications and applications as do not depart from the true spirit and scope of the invention.

We claim:

1. A method of making an engine block using coated cylinder bore liners, comprising:

(a) casting a metallic engine block having one or more cylinders bores;

(b) extruding a metallic tubing and fabricating a thin walled liner from said extruded tubing for each bore, said liner having a tube axis, a cleansed inner surface and an outer surface with an outer diameter slightly greater than the internal diameter of said cylinder bore;

(c) relatively rotating said liner with respect to at least one nozzle for applying a plurality of materials to the internal surface of said liner to form a coating system, the materials comprising first a metal texturing fluid that is applied at high pressure to expose fresh metal of said surface, secondly a bond coating material that is thermally sprayed to form a metallurgical bond with said internal surface, and thirdly a topcoat anti-friction material that is plasma sprayed to adher to said bond coating;

(d) interference fitting said coated liner to said cylinder bore by freezing said liner while maintaining the block at about ambient temperature to permit implanting of the liner; and (e) honing said coated internal surface to remove up to 100 microns of topcoating, leaving a finished surface that is concentric to said tube axis within ±15 microns.

2. A method of making an engine block using coated cylinder bore liners, comprising:

(a) casting a metallic engine block having one or more cylinder bores;

(b) fabricating a thin walled liner for each bore, said liner being constituted of an extruded metallic tubing having a tube axis, a cleansed inner surface and an outer surface defining an outer diameter slightly greater than the internal diameter of said cylinder bore, said liner having a wall thickness in the range of 1–5 mm and uniform straightness of said inner surface within ±15 microns;

(c) relatively rotating said liner with respect to at least one nozzle for applying a plurality of materials to the internal surface of said liner to form a coating system, the materials comprising first a metal texturing fluid that is applied at high pressure to expose fresh metal of said surface, secondly a bond coating material that is thermally sprayed to form a metallurgical bond with said internal surface, and thirdly a topcoat anti-friction material that is plasma sprayed to adher to said bond coating;

(d) interference fitting said coated liner to said cylinder bore by freezing said liner while maintaining the block at about ambient temperature to permit implanting of the liners; and (e) honing said coated internal surface to remove up to 100 microns of topcoating, leaving a finished surface that is concentric to said tube axis within ±15 microns.

3. A method of making an engine block using coated cylinder bore liners, comprising:

(a) casting a metallic engine block having one or more cylinder bores;

(b) fabricating a thin walled liner for each bore, said liner being constituted of an extruded metallic tubing having a tube axis, a cleansed inner surface and an outer surface defining an outer diameter slightly greater than the internal diameter of said cylinder bore;

(c) relatively rotating said liner with respect to at least one nozzle for applying a plurality of materials to the internal surface of said liner to form a coating system, the materials comprising first a metal texturing fluid that is applied at high pressure to expose fresh metal of said surface, secondly a bond coating material that is thermally sprayed to form a metallurgical bond with said internal surface, and thirdly a topcoat anti-friction material that is plasma sprayed to adher to said bond coating;

(d) interference fitting said coated liner to said cylinder bore by freezing said liner while maintaining the block at about ambient temperature to permit implanting of the liner the dimensional difference between the external diameter of said liner and the internal diameter of said cylinder bores being an interference fit of 35 microns ±15 microns; and (e) honing said coated internal surface to remove up to 100 microns of topcoating, leaving a finished surface that is concentric to said tube axis within ±15 microns.

4. The method as in claim 1, in which said engine block is constituted of an aluminum base material and said liners are constituted of an aluminum base material.

5. The method as in claim 1, in which said liners are rotated about a fixed nozzle.

6. The method as in claim 1, in which said bond coating is constituted of at least one of nickel aluminide and iron aluminide containing aluminum in the range of 2–6% by weight.

7. The method as in claim 6, in which said topcoat is comprised of particles selected from the group of: (b) a composite of martensitic stainless steel and nickel coated boron nitride; (b) a composite of martensitic stainless steel and one of boron nitride, eutectic particles of calcium fluoride and lithium fluoride, and barium fluoride particles; and (c) iron based oxides having a high solid lubricant property.

8. The method as in claim 7, in which said martensitic stainless steel particles are constituted of the following alloy ingredients, 2–4% by weight nickel, 8–16% chromium, 4–8% manganese and 0.2–0.4% carbon, the total of said alloy ingredients not being greater than 25%.

9. The method as in claim 1, in which the total thickness of said coating system is 100–400 microns prior to honing.

10. The method as in claim 1, in which the cleaning of said inner surface of said liner is carried out by washing and vapor degreasing.

11. The method as in claim 1, in which said metal texturing fluid is comprised of abrasive grit, water or gas etching.

12. The method as in claim 5, in which said axis is horizontal and said nozzles are placed to enter the interior of said liner while said liner surface rotates there around.

13. The method as in claim 1, in which the outside surface of said liners are coated with a mixture of copper flake and polymer to promote adhesion of the exterior surface of the liner with the cylinder block upon implantation.

14. The method as in claim 1, in which said honed surface is subjected to an abradable polymer and solid lubricant mixture.

15. The method as in claim 1 in which the resulting block comprises:

(a) an aluminum alloy body having one or more precision formed cylinder bores;

(b) an extruded aluminum liner interference fit into each bore with an interference fit, the liner having an internal surface which has been coated with a coating system prior to such implantation; and (c) a coating system comprising a topcoat of plasma sprayed iron based particles which, by themselves or by the presence of additional particles, provide solid lubrication properties.

* * * * *